United States Patent
Tsuruoka et al.

(10) Patent No.: US 7,357,690 B2
(45) Date of Patent: Apr. 15, 2008

(54) METHOD FOR ALIGNING NEEDLE-LIKE STRUCTURES AND ALIGNMENT UNIT

(75) Inventors: Yuji Tsuruoka, Kawasaki (JP); Kazuo Iwata, Yokohama (JP); Kazuhiro Jindai, Yokohama (JP); Hidehito Takayama, Chigasaki (JP); Eiichi Motai, Yokohama (JP); Takashi Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 10/991,105

(22) Filed: Nov. 17, 2004

(65) Prior Publication Data

US 2005/0189859 A1    Sep. 1, 2005

(30) Foreign Application Priority Data

Nov. 19, 2003    (JP)    .............................. 2003-389306

(51) Int. Cl.
*B05D 3/12*    (2006.01)
*B05D 3/00*    (2006.01)

(52) U.S. Cl. ............................ 445/49; 445/50; 445/51; 977/890; 977/892; 977/893; 427/355; 427/356

(58) Field of Classification Search ........ 977/840–842, 977/857, 858, 890; 445/49–51
See application file for complete search history.

(56) References Cited

U.S. PATENT DOCUMENTS

| | | | | |
|---|---|---|---|---|
| 6,019,656 | A | * | 2/2000 | Park et al. .................... 445/24 |
| 6,653,366 | B1 | * | 11/2003 | Imai et al. .................. 523/160 |
| 6,739,932 | B2 | * | 5/2004 | Yaniv et al. .................. 445/24 |
| 6,741,017 | B1 | * | 5/2004 | Ide et al. ..................... 977/939 |
| 2003/0117065 | A1 | | 6/2003 | Okai et al. | |

FOREIGN PATENT DOCUMENTS

| | | | |
|---|---|---|---|
| JP | 2000-208026 A | | 7/2000 |
| JP | 2001-195972 A | | 7/2001 |
| JP | 2005075711 A | * | 3/2005 |

* cited by examiner

*Primary Examiner*—Mariceli Santiago
(74) *Attorney, Agent, or Firm*—Canon U.S.A. Inc I.P. Div

(57) ABSTRACT

An alignment unit and an alignment method for aligning needle-like structures. The alignment unit includes a substrate having a surface and grooves defined in the surface. The grooves are sized and arranged such that when the needle-like structures are received therein, the needle-like structures are aligned.

6 Claims, 5 Drawing Sheets

METHOD FOR ALIGNING NEEDLE-LIKE STRUCTURES AND ALIGNMENT UNIT

CROSS REFFERENCE

This application claims priority from Japanese Patent Application No. 2003-389306 filed Nov. 19, 2003, which is hereby incorporated by reference herein. This application is related to U.S. application Ser. No. 10/990,608, entitled "LIQUID DISCHARGE APPARATUS AND METHOD FOR ALIGNING NEEDLE-LIKE STRUCTURES," filed Nov. 17, 2004, which is hereby incorporated by reference herein.

BACKGROUND OF THE INVENTION

1. Field of the Invention

The present invention relates to a method for aligning needle-like structures and an alignment unit.

2. Description of the Related Art

Recent attention-getting carbon nanotubes, which represent needle-like structures, have structures in which $sp^2$ carbons, which constitute a graphite structure, bonded in a plane are rolled into a cylinder on the order of nanometers. The carbon nanotubes have many superior characteristics, and accordingly have been used in various applications. In particular, the carbon nanotubes are often used in electrical materials because of their electrical characteristic in which they can be well conductive or semiconductive. One application of the carbon nanotubes is to use them in MOS transistors.

FIG. 6 is a schematic illustration of a known MOS transistor. For fabrication of the MOS transistor, a plurality of carbon nanotubes 104 are aligned in the same direction on a $SiO_2$ film 11 over a silicon substrate 10, and a source electrode 12, a drain electrode 13, and a gate electrode 14 are formed by photolithography. Then, a high voltage is applied between the source electrode 12 and the drain electrode 13 to break well-conductive carbon nanotubes and allow semiconductive carbon nanotubes to remain. Thus, the MOS transistor is made.

Another application of the carbon nanotubes is to use them as electron sources of field emission displays (FEDs). Carbon nanotubes emit electrons when voltage is applied to them. Many carbon nanotubes are bundled together in the same direction to form an electron emitter, and such electron emitters are two-dimensionally arranged into an FED electron source. Carbon nanotubes have been used in various other applications, and are, in most of the applications, required to be aligned in one direction.

For the alignment of carbon nanotubes, some methods have been disclosed in Japanese Patent Laid-Open Nos. 2000-208026, 2001-93404, 2001-195972, and 2003-197131, and all of which are involved in FED electron sources. In Japanese Patent Laid-Open No. 2000-208026, a material containing carbon nanotubes is encapsulated in a cylinder, and the cylinder is elongated to align the carbon nanotubes in the elongated direction. In Japanese Patent Laid-Open No. 2001-93404 (corresponding U.S. Pat. No. 6,741,017), a conductive paste containing dispersed carbon nanotubes is pressed into many through-holes formed in a ceramic sheet, so that the carbon nanotubes are aligned in a direction perpendicular to the substrate. In Japanese Patent Laid-Open No. 2001-195972, a paste containing dispersed carbon nanotubes is applied to a serrated feature or other physical shapes provided at the surface of a substrate, by screen printing or spin coating. Thus, the carbon nanotubes are aligned in a direction perpendicular to the surface of the substrate. In Japanese Patent Laid-Open No. 2003-197131 (corresponding U.S. Patent Application Publication No. 2003/117065), carbon nanotubes are placed in many small recesses formed in the surface of a metal film to align them in a direction perpendicular to the surface of the metal film.

These methods, however, have disadvantages as follows. The method disclosed in Japanese Patent Laid-open No. 2000-208026 requires complicated production steps for alignment. Furthermore, in order to use the aligned carbon nanotubes for an FED electron source, the method requires additional steps to array the aligned carbon nanotubes in a matrix, thus increasing the number of production steps.

The methods of Japanese Patent Laid-Open Nos. 2001-93404, 2001-195972, and 2003-197131 limit miniaturization of each electron emitter because in the methods, carbon nanotubes are aligned in a direction perpendicular to the substrate so as to be arrayed in a matrix.

SUMMARY OF THE INVENTION

The present invention is directed to a method for easily aligning needle-like structures, and to an alignment unit for aligning the needle-like structures. In one aspect of the present invention, an alignment unit for aligning carbon nanotubes includes a substrate having a surface, and at least one groove defined in the surface, wherein the groove is sized to receive the carbon nanotubes therein in parallel with the surface of the substrate. In another aspect, a device includes a plurality of alignment units as described above, wherein the alignment units are stacked on top of one another. In yet another aspect, a method for aligning needle-like structures includes a providing step of providing a substrate having a surface and at least one groove defined therein; and an alignment step of placing the needle-like structures dispersed in a disperse medium in the groove so that the needle-like structures align along a length of the groove in parallel with the surface of the substrate.

Further features and advantages of the present invention will become apparent from the following description of the embodiments with reference to the attached drawings.

DESCRIPTION OF THE EMBODIMENTS

Embodiments of the present invention will now be described with reference to the drawings.

First Embodiment

The present embodiment uses carbon nanotubes as representatives of needle-like structures. A method for aligning carbon nanotubes will first be described, and then a process for arraying the aligned carbon nanotubes in a matrix will be described.

1. Method for Aligning Carbon Nanotubes

A method for aligning carbon nanotubes on a substrate will now be described with reference to FIGS. 1A to 1D.

Figure 1A:
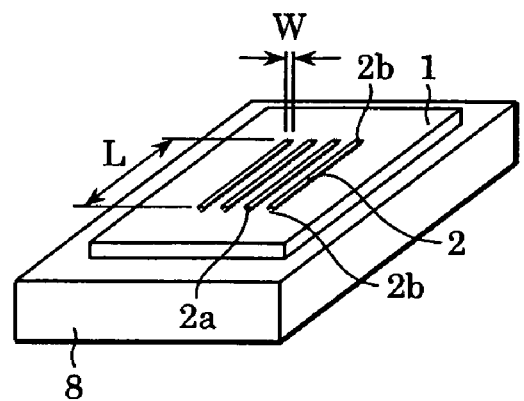
FIGS. 1A to 1D are schematic illustrations showing steps of a method for aligning carbon nanotubes on a substrate according to a first embodiment.

A substrate 1 shown in FIG. 1A has a plurality of grooves 2 formed in its surface. The material of the substrate 1 is not particularly limited, and the substrate 1 may be made of an insulating material, such as ceramic or resin, or a semiconductive or conductive material, such as a silicon wafer or metal. Also, the substrate 1 can include silicon covered with an oxide layer, such as a $SiO_2$ film. Any material may constitute the substrate 1, as long as flatness is ensured at the surface of the substrate 1.

The grooves 2 have V-shaped cross sections whose vertexes point down and are formed in the substrate 1 substantially in parallel with each other at predetermined intervals. The grooves 2 are intended for use to align carbon nanotubes 4. The carbon nanotubes 4 are placed in the grooves 2 along sidewalls 2a of the grooves 2, as described below, thereby being aligned. Therefore, the width w of the opening of the grooves 2 is set larger than the diameter of the carbon nanotubes 4 so that the carbon nanotubes 4 can be placed in the grooves 2. Also, in order for the carbon nanotubes 4 to lie along the sidewalls 2a of the grooves 2, the width w is set smaller than the length of the carbon nanotubes 4.

While FIGS. 1A to 1D illustrate V-shaped grooves by way of example, the grooves 2 may have any shape that facilitates aligning the carbon nanotubes 4. For example, the cross section of the grooves 2 may be rectangular, trapezoidal, semicircular, or semioval. Since the cross section of the grooves 2 is V-shaped in the present embodiment, the carbon nanotubes 4 are aligned along the sidewalls 2a of the grooves 2. If the cross section is, for example, rectangular, however, the carbon nanotubes 4 may be aligned along the bottoms of the grooves 2. In other words, the grooves 2 can have any shape as long as the carbon nanotubes 4 can be aligned along the inner walls of the grooves.

The carbon nanotubes 4 can have diameters in the range between several nanometers to several tens of nanometers and lengths in the range between several micrometers to several tens of micrometers. For example, the carbon nanotubes 4 can have a diameter of about 20 nm and a length of about 20 μm. Accordingly, it may suffice that the width w of the grooves 2 is set at less than the length of the carbon nanotubes, 20 μm. The width w of the grooves 2 can be tens of times the diameter of the carbon nanotubes 4 and the length L of the grooves 2 be about 1.5 times the length of the carbon nanotubes 4, in order to enhance alignment capabilities. In the present embodiment, the grooves 2 have a width w of 500 nm and a length L of about 30 μm. The length L of the grooves 2 may be still longer because it may be cut according to the application after alignment. For an FED electron source, the grooves 2 can have a width W of about 500 nm and a length L of about 1 mm. While the present embodiment illustrates grooves 2 having a smaller length L than the longitudinal length of the substrate 1, the length L may be the same as the longitudinal length of the substrate 1.

The grooves 2 may be formed by ion beams, electron beams, or light beams with a wavelength shorter than or equal to that of visible light, or by rubbing. If the substrate 1 is silicon wafer, the grooves 2 may be formed by dry etching or anisotropic etching. The substrate 1 is put on a stage 8.

Figure 1B:
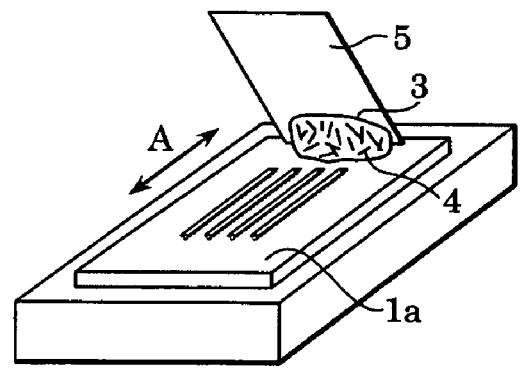

FIG. 1B shows the step of placing the carbon nanotubes 4 dispersed in a paste 3 in the grooves 2 with a squeegee 5.

The paste 3, which serves as a disperse medium, is conductive in the present embodiment. For example, in an application to MOS transistors of the present embodiment, a conductive paste is used as the disperse medium. The paste 3, however, is not limited to being conductive, and may be insulative. Insulative disperse media include resin paste and material with a relatively low viscosity, such as solvent.

The direction in which the squeegee 5 sweeps the paste 3 to place the carbon nanotubes 4 in the grooves 2 is not particularly limited. However, it is effective that the squeegee 5 positioned substantially perpendicularly to the longitudinal direction of the grooves 2, designated by double-headed arrow A, is reciprocated in the longitudinal direction A, as shown in FIG. 1B, in comparison with the case where the squeegee 5 positioned substantially in parallel with the longitudinal direction A is reciprocated in the direction perpendicular to the longitudinal direction A. This is because sweeping in the longitudinal direction A reduces the probability of removing the carbon nanotubes 4 in the grooves and facilitates the collection of carbon nanotubes 4 left on the surface 1a of the substrate 1 without being aligned in the grooves 2.

Figure 1C:
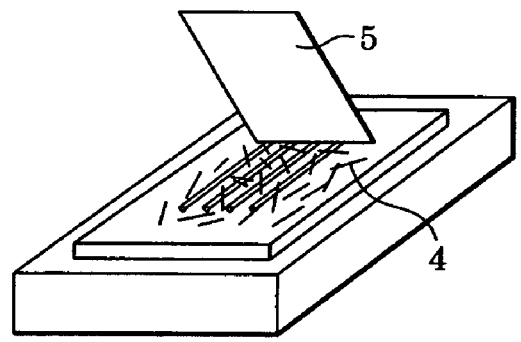

FIG. 1C shows the step of scraping the carbon nanotubes 4 remaining on the surface 1a of the substrate 1 with the squeegee 5. The carbon nanotubes 4 scraped in this step are reused in the step shown in FIG. 1B.

Figure 1D:
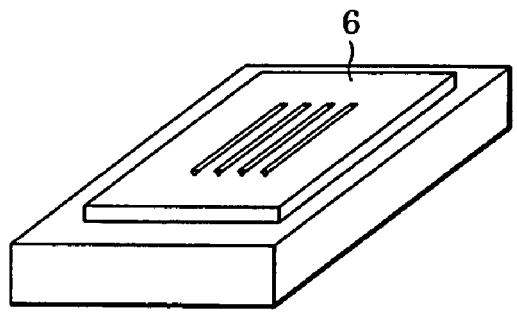

FIG. 1D is a perspective view of a resulting alignment unit 6 prepared by placing the carbon nanotubes 4 in the grooves 2 along the sidewalls 2a of the grooves 2 to align them in the longitudinal direction of the grooves 2. The paste 3 here is heated to remove the solvent. The sequence of the steps of applying the paste 3 containing the carbon nanotubes 4 (FIG. 1B), of scraping the carbon nanotubes 4 (FIG. 1C), and of heating the paste 3 can be repeated, so that the carbon nanotubes 4 can be closely placed in the grooves 2. The heating may be performed on the substrate 1 with, for example, a heater contained in a stage 8 supporting the substrate 1 or an external heating device.

What is required in the method of the present invention is only to place carbon nanotubes in grooves formed in a substrate. Thus, the carbon nanotubes can be easily aligned by the method. In addition, the method of the present invention allows carbon nanotubes remaining on the substrate to be recycled and thus to prevent waste of the carbon nanotubes, while in the known art it is difficult to recycle remaining or non-aligned carbon nanotubes.

In order to make an FED electron source, a plurality of alignment units 6 are laid on top of one another so that the carbon nanotubes are arrayed in a matrix. This process for making the FED electron source will be described below.

In a process for making MOS transistors using carbon nanotubes by the method of the present invention, the substrate 1 includes silicon covered with a $SiO_2$ film. In this instance, it is necessary, on the $SiO_2$ film, that carbon nanotubes 4 with lengths uniform to some extent are aligned in parallel with each other and that the ends in the longitudinal direction of the carbon nanotubes are aligned. In such a case, the length of the grooves 2 is larger to some extent (for example, 1.2 times larger) than that of the carbon nanotubes 4. Consequently, the carbon nanotubes 4 placed in the grooves 2 are aligned not only along the sidewalls 2a of the grooves 2, but also at the ends 2b (see FIG. 1A) of the grooves 2.

The grooves 2 can be formed at the surface of the SiO$_2$ film by dry etching. After the alignment unit 6 is prepared by placing the carbon nanotubes 4 in the grooves 2 in the same method as described above, the alignment unit 6 is provided with a source electrode, a drain electrode, and a gate electrode by photolithography or ink jetting. Thus, a MOS transistor using carbon nanotubes 4 is completed.

2. Process for Making Matrix Electrode

Turning now to FIGS. 2A to 2D, a process will be described for making a matrix electrode from the carbon nanotube-aligned units or alignment units 6 prepared in the alignment method described above, so as to be used as an FED electron source.

Figure 2A:
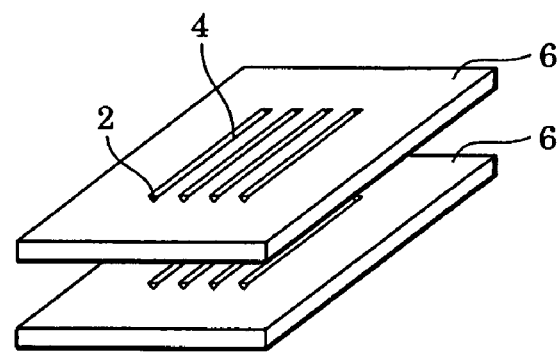
FIGS. 2A to 2D are schematic illustrations showing steps of a process for forming matrix electrodes from alignment units prepared in the alignment method according to the first embodiment.

FIG. 2A shows that an alignment unit 6 including carbon nanotubes 4 aligned in four grooves 2 is superposed on another alignment unit 6 having the same structure. A plurality of the alignment units 6 are laid on top of one another so that the grooves 2 extend in the same direction. The alignment units 6 are bonded to one another by an appropriate technique suitably selected according to the material of the substrate 1. For substrates made of ceramic or silicon, as in the present embodiment, use of an epoxy adhesive or surface activation bonding allows the alignment units 6 to adhere at room temperature. For silicon substrates, the alignment units 6 can be bonded by silicon bonding at high temperatures. In order to bond the alignment units 6 precisely, use of adhesive is not suitable, but activation bonding and silicon bonding are suitable.

Figure 2B:
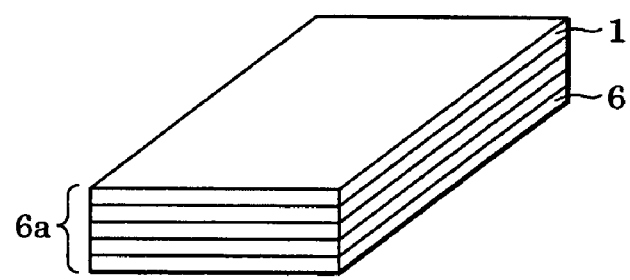

After a desired number of alignment units 6 are superposed as described above, a substrate 1 having no grooves is disposed on and bonded to the top alignment unit 6, as shown in FIG. 2B. Thus, a composite 6a of the alignment units 6 is prepared. FIG. 2B shows the composite 6a in which the substrate 1 with no grooves is disposed on top of four alignment units 6.

Figure 2C:
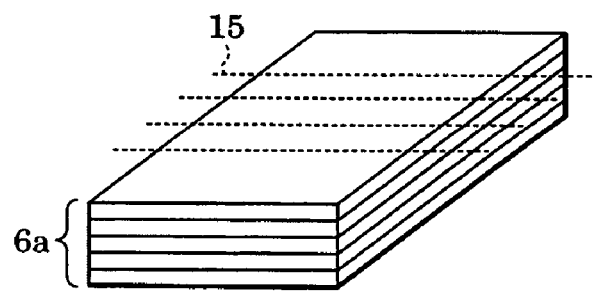
Figure 2D:
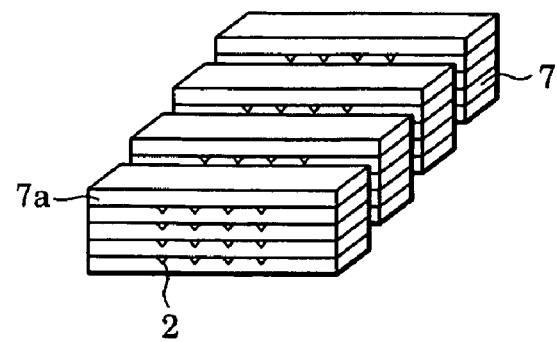

The composite 6a is cut into several pieces along cut lines 15 shown in FIG. 2C. The cut lines 15 are set so as to intersect the grooves 2, at such intervals as to form matrix electrodes 7 with desired dimensions. In this instance, the intervals between the cut lines 15 are set within the groove length L so that the grooves 2 are exposed at the end surfaces 7a of the resulting matrix electrodes 7.

Thus, the matrix electrodes 7, each in which the grooves 2 including aligned carbon nanotubes 4 serving as electron emitters (electrodes) are arrayed in a 4 by 4 matrix at the end surfaces 7a, are completed through the steps of preparing the composite 6a constituted of four alignment units 6, each having four grooves 2, and of cutting the composite 6a into several pieces along the cut lines 15.

The cutting of the composite 6a may be performed with a laser. Since the alignment units 6 are tightly bonded to one another, a common dicer can also be used.

In the present embodiment, the grooves 2 are arranged so as to extend in the same direction in the composite 6a. However, the arrangement of the grooves 2 is not limited to this, and the alignment units 6 may be superposed in such a manner that the directions of the grooves 2 are different.

In the present embodiment, by selecting the intervals between the grooves 2 and the thickness of the substrate 1, the intervals between the electrode lines of the matrix electrode 7 can be arbitrarily varied, and set small and precisely.

Second Embodiment

A second embodiment will describe a method for forming a line electrode from aligned carbon nanotubes.

Figure 3:
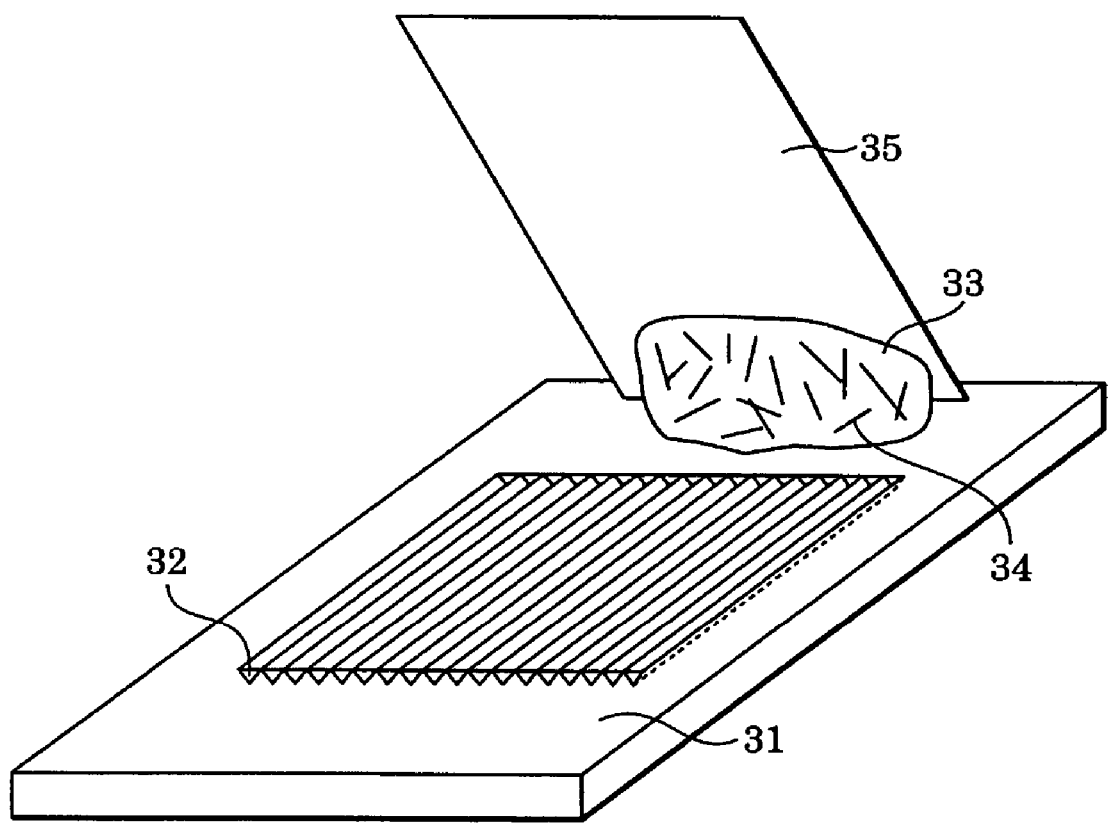
FIG. 3 is a schematic illustration showing a step of a method for aligning carbon nanotubes on a substrate according to a second embodiment.

FIG. 3 shows the step of placing carbon nanotubes 34 dispersed in a conductive paste 33 in grooves 32 formed in a substrate 31. The conductive paste 33 is dispersed with a squeegee 35. The substrate 31 in the present embodiment has continuously adjoining grooves with no intervals. The grooves 32 are formed in the same manner as in the first embodiment, and the description is not repeated.

Turning now to FIGS. 4A to 4D, a method is described for making a line electrode from alignment units 36 prepared as shown in FIG. 3.

Figure 4A:
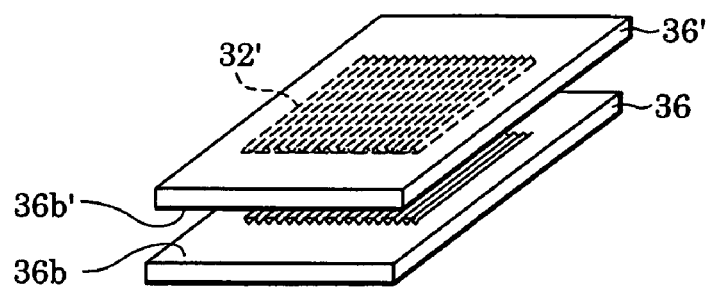
FIGS. 4A to 4D are schematic illustrations showing steps of a process for forming line electrodes from alignment units prepared in the alignment method according to the second embodiment.
Figure 4B:
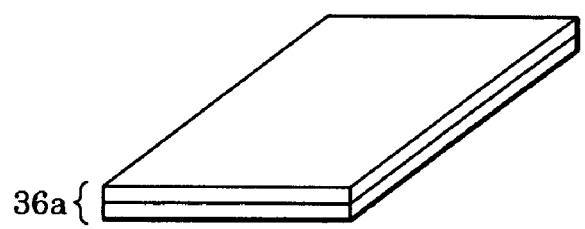

FIG. 4A shows two alignment units 36 and 36' whose surfaces 36b and 36b' having the grooves oppose each other. These units 36 and 36' are superposed to form a composite 36a, as shown in FIG. 4B. In this instance, the grooves 32 of the alignment unit 36 are disposed so as to be shifted from the grooves 32' of the alignment unit 36' by half a pitch in the direction in which the lines of the grooves are arranged. If a conductive solution, which is prepared by dispersing metal particles in a solvent, is used, the composite 36a is heat-treated after the step shown in FIG. 4B. The heat treatment sinters the metal particles to enhance the conductivity.

Figure 4C:
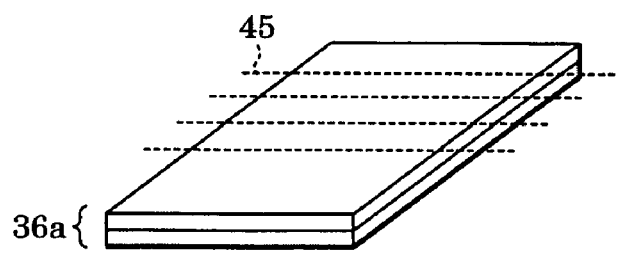
Figure 4D:
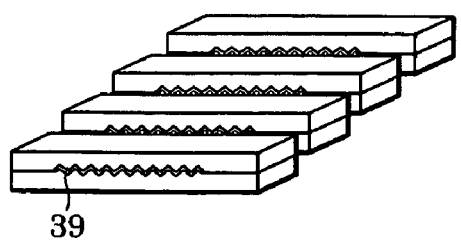
Figure 5:
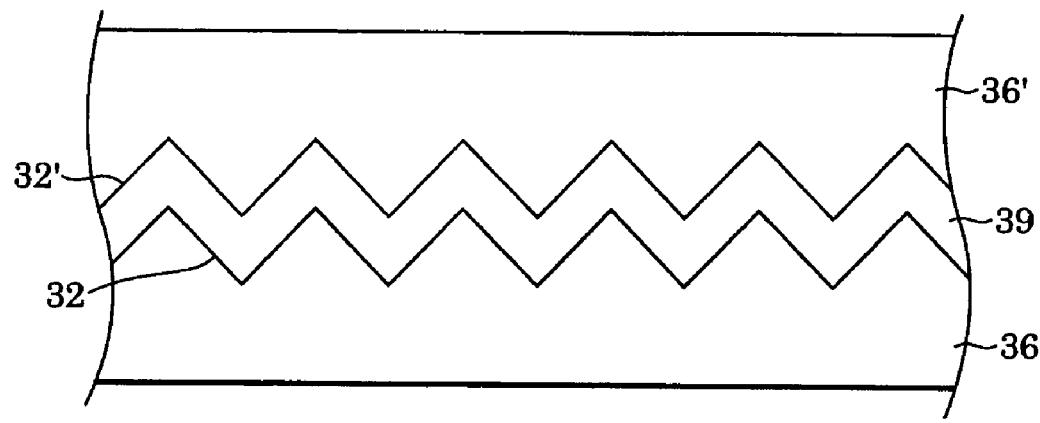
FIG. 5 is a fragmentary enlarged view of the line electrode.
Figure 6:
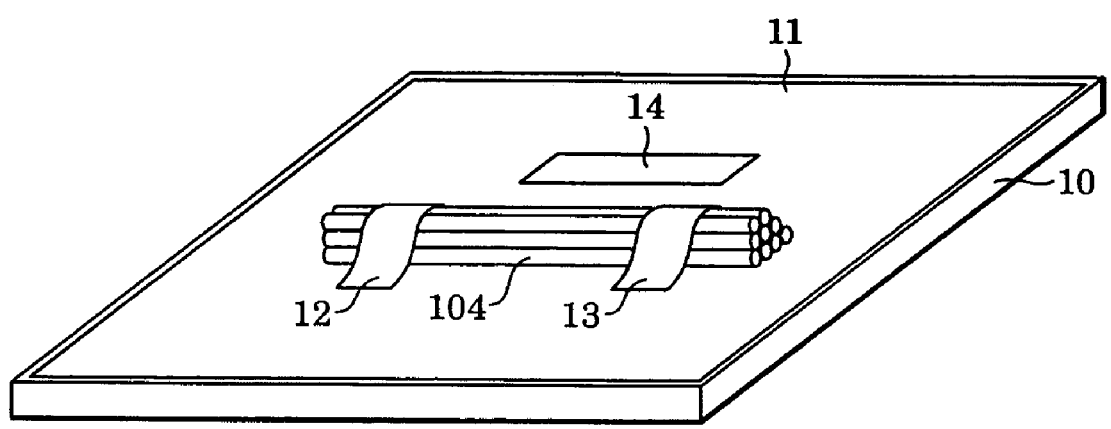
FIG. 6 is a schematic illustration of a known MOS transistor.

The composite 36a in which the groove-having surfaces 36b and 36b' oppose each other with the grooves 32 and 32' staggered half a pitch is cut into several pieces along cut lines 45 shown in FIG. 4C to prepare line electrodes 39 shown in FIG. 4D. Specifically, by staggering the grooves 32 and 32' half a pitch, the carbon nanotubes 34 aligned in the grooves 32 and 32' communicate in a triangular wave form, as shown in FIG. 5. Thus, line electrodes 39 are completed, each of which is constituted of the aligned carbon nanotubes 34 continuing in a triangular wave form in the direction of the line arrangement of the grooves 32 and 32'. The section of the line electrode 39 is not limited to such a triangular wave shape, and may depend on the shape of grooves 32 and 32', which may be rectangular, trapezoidal, semicircular, or semioval.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for aligning needle-like structures, comprising:
   a providing step of providing a substrate having a surface and at least one groove defined therein; and
   an alignment step of placing the needle-like structures dispersed in a disperse medium in the groove so that the needle-like structures align along a length of the groove in parallel with the surface of the substrate.

2. The method according to claim 1, wherein the alignment step includes sweeping the disperse medium with the needle-like structures into the groove with a squeegee.

3. The method according to claim 1, further comprising a scraping step of scraping the disperse medium with the needle-like structures remaining in regions other than the groove after the alignment step.

4. The method according to claim 3, wherein the scrape step includes sweeping the surface having the groove of the substrate with the squeegee.

5. The method according to claim 1, further comprising a heating step of heating the disperse medium containing the needle-like structures after the alignment step.

6. The method according to claim 1, wherein the needle-like structures are carbon nanotubes.

* * * * *